United States Patent [19]

Wilson et al.

[11] Patent Number: 4,716,698

[45] Date of Patent: Jan. 5, 1988

[54] WALL SYSTEM WITH SPLIT POLE FOR LAY-IN WIRING

[75] Inventors: Harold Wilson; Bin Lim, both of Holland; Brian Gingrich, Wyoming, all of Mich.

[73] Assignee: Haworth, Inc., Holland, Mich.

[21] Appl. No.: 871,658

[22] Filed: Jun. 6, 1986

[51] Int. Cl.⁴ ............................................. E04F 19/06
[52] U.S. Cl. ........................................ 52/239; 52/243; 52/221; 174/48
[58] Field of Search ................. 52/239, 243, 243.1, 52/726, 403, 730, 732, 242, 221; 160/127, 135; 174/48, 49

[56] References Cited

U.S. PATENT DOCUMENTS

| | | | |
|---|---|---|---|
| 3,363,383 | 1/1968 | La Barge | 52/403 |
| 3,370,389 | 2/1968 | Macaluso | 52/730 |
| 3,871,153 | 3/1975 | Birum | 52/239 |
| 3,990,204 | 11/1976 | Haworth et al. | 52/242 |
| 4,060,294 | 11/1977 | Haworth et al. | 52/239 |
| 4,232,183 | 11/1980 | Person | 174/48 |
| 4,278,834 | 7/1981 | Boundy | 174/48 |
| 4,344,475 | 8/1982 | Frey | 160/135 |
| 4,367,370 | 1/1983 | Wilson et al. | 174/48 |
| 4,370,008 | 1/1983 | Haworth et al. | 339/4 |
| 4,375,010 | 2/1983 | Mollenkopf | 160/127 |
| 4,535,577 | 8/1985 | Tenser et al. | 174/48 |

Primary Examiner—James L. Ridgill, Jr.
Attorney, Agent, or Firm—Flynn, Thiel, Boutell & Tanis

[57] ABSTRACT

A vertical pole arrangement which is keyed between and extends upwardly to the ceiling from between a pair of space divider panels. The pole arrangement has a vertically elongated removable side cover which provides access to the interior of the pole arrangement for laying in of cables. The post arrangement is split into upper and lower pole members, with the upper member projecting downwardly for slidable keyed engagement between the panels. The upper post member, at the lower free end, has upwardly extending slots in the end walls thereof for accommodating cables which extend along top channels in the panels.

3 Claims, 6 Drawing Figures

WALL SYSTEM WITH SPLIT POLE FOR LAY-IN WIRING

FIELD OF THE INVENTION

This invention relates to an improved ceiling-type pole arrangement as used in association with a space-divider wall panel system for facilitating the handling and laying-in of communication and/or electrical cabling.

BACKGROUND OF THE INVENTION

The office environment of today makes extensive use of the so-called "opening office system" for dividing large open areas into smaller work areas. Such open office system employs upright space divider panels which are serially connected together for dividing the large area into smaller work areas. Such panels conventionally mount thereon numerous furniture components such as work surfaces, filing cabinets and the like for use within the individual work areas. Such panels, which are supported on the floor and project upwardly therefrom, typically having a height which is substantially less than floor-to-ceiling height so that the upper edges of the panels are spaced downwardly a substantial distance from the ceiling. Such panels often times employ electrical wiring integrated therein, with such wiring typically being confined within a raceway structure which is integrated with the panel along the lower horizontally extending edge thereof. Electrical power is supplied to the electrified raceway structure from electrical monuments in either the floor or the ceiling. The latter is a preferred location since such environments typically employ a drop-type or suspended ceiling which provides a space thereabove for equipment such as electrical and communication cabling, heating and ventilation, and the like. When the electrical cabling and the electrical monuments are positioned above the drop ceiling, then electrical power is supplied to the electrified raceways associated with the panel system through a floor-to-ceiling pole (often referred to as a power pole) which is typically joined between a pair of panels and projects upwardly thereabove. The upper end of this pole terminates at or slightly above the suspended ceiling. This arrangement is well known, being illustrated by FIG. 1 herewith, and permits cabling to be fed downwardly from above the suspended ceiling through the interior of the pole for connection to cabling associated with the wall panels.

In open office systems of the aforementioned type, it has been conventional to run both electrical and communication cabling through the raceway assembly associated with the lower edges of the panels. However, due to the substantially increased needs of both communication and power capability, the tendency has been to separate the electrical and communication cabling from one another, and hence attempts have been made to run the communication cables along a channel or raceway formed along the upper edges of the panels, with the power cables still being run along the raceways associated with the lower edges of the panels. This arrangement, however, substantially complicates the installation of communication cables, particularly when using a ceiling-type pole. The communication cables are typically installed into the wall system after the wall system has been fully assembled inasmuch as the communication cables must be fed into and along the wall system in dependence on the types and amount of communication equipment which is being utilized in the various work areas. Hence, the communication cabling can be fed along the raceways or channels associated with the upper edges of the panels merely by removing the top caps from the individual panels, but when encountering a ceiling-type pole, it is necessary to provide a closed slot extending transversely through the pole, and hence the communication cables must be individually fed, as by inserting a free end of each cable, through the slot in the pole. Needless to say, this is a time-consuming and labor-intensive operation, particularly when working with significant numbers or long-lengths of communication cabling. Thus, the conventional ceiling-type pole arrangement, particularly when used in conjunction with a wall system employing top channels for the communication cabling, hence results in a wall system which requires complex and time-consuming installation procedures with respect to on-site installation of communication cabling.

Accordingly, it is an object of this invention to provide an improved ceiling-type pole arrangement for use with an open-office wall panel system, which improved pole arrangement overcomes the above-mentioned disadvantage.

More specifically, the present invention relates to an improved ceiling-type pole arrangement for use with a space-divider wall system, which pole arrangement is longitudinally split into upper and lower pole portions which are aligned and abut in end-to-end relationship when assembled for cooperation with and connection between a pair of wall panels. The upper and lower pole portions interfit between and are splined or keyed to the pair of adjacent wall panels, and the upper pole portion has at least the lower part thereof disposed so as to project downwardly a small extent into the region between the adjacent pair of panels so as to be splined thereto. The lower end part of this upper pole portion, however, contains slots in the opposed side walls thereof, which slots open upwardly from the lower free end of the upper pole portion and communicate with channels which extend along the upper edges of the panels. These latter channels are adapted to accommodate cabling therein so that cabling extending along these channels can extend through the slots to hence extend across the pole for continuous communication with the pair of panels which join to opposite sides of the pole. Since the ceiling pole is split into the upper and lower portions, when the lay-in of communication cables is desired, the upper pole portion can be longitudinally slidably displaced upwardly a small extent so as to disengage itself from the keys or splines. In this position the lower free end of the upper pole portion is disposed at or slightly above the upper edges of the panels, whereupon communication cables can be laid into the top channel of one panel and then moved sidewardly and hence laid into the slot so as to jumper across into the channel of the adjacent panel. The upper pole portion can then be moved downwardly so as to again slidably engage the keys or splines, with the upper pole portion being slid downwardly until it effectively abuts the upper end of the lower pole portion. The upper and lower pole portions define a continuous interior channel therethrough for receiving cabling, and at least one of the exposed side walls of the upper and lower pole portions is open throughout the length thereof to facilitate the laying-in of cabling along the power pole, which cabling can be laid in vertically therealong and bent horizontally into one of the top channels of an adjacent panel, such as when the upper pole portion is in its raised position. A continuous cover extends throughout the length of the upper and lower pole portions, with this cover snapping into the opening of the pole portions so as to close off the opening and form a closed surface which is substantially flush with the sides of the panel. This continuous cover effectively disguises or visually hides the split between the upper and lower pole portions, which split is positioned downwardly a small distance from the upper edges of the panels, whereby the split pole arrangement does not significantly visually effect the desirable appearance of the system.

Other object and purposes of the invention will be apparent to persons familiar with systems of this type upon reading the following specification and inspecting the accompanying drawings.

Figure 1:
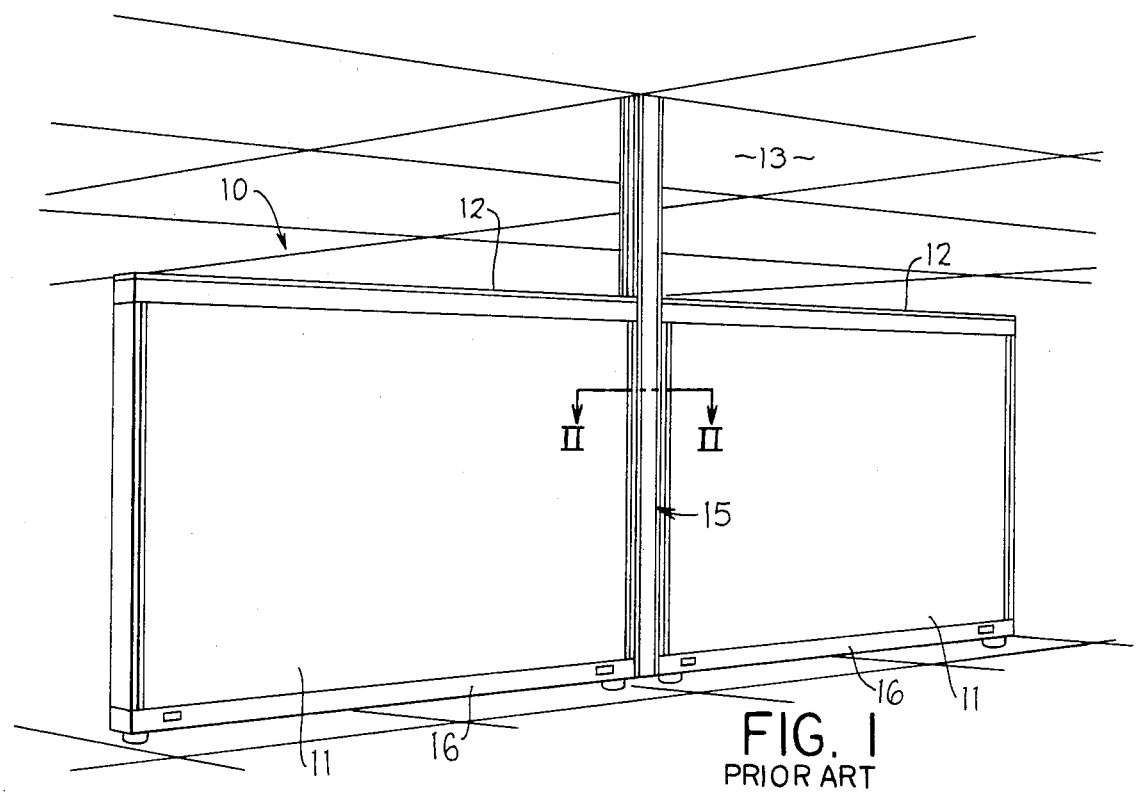
FIG. 1 illustrates a conventional space-divider wall system employing a conventional ceiling-type pole arrangement therewith.

Certain terminology will be used in the following description for convenience in reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the system and designated parts thereof. Said terminology will include the words specifically mentioned, derivatives thereof, and words of similar import.

DETAILED DESCRIPTION

Figure 2:
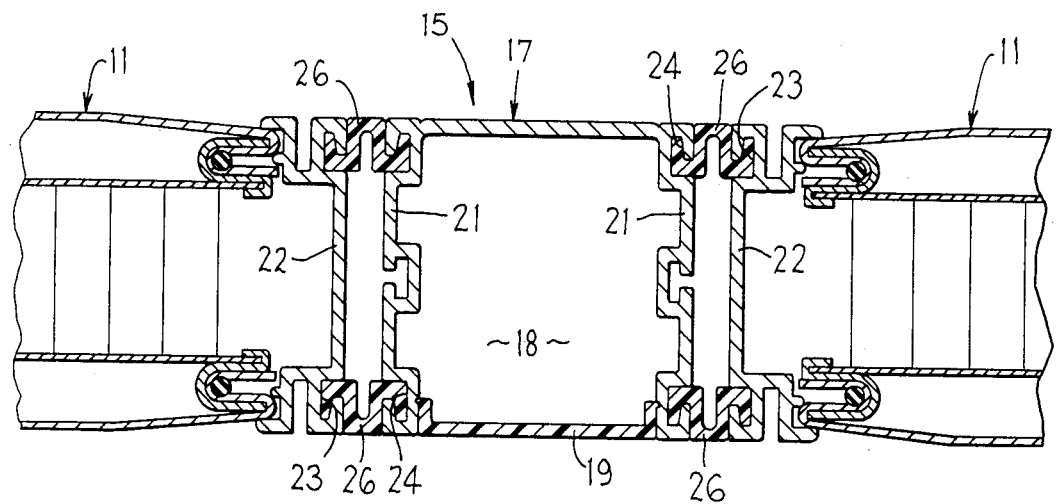
FIG. 2 is an enlarged, fragmentary sectional view taken along line II—II in FIG. 1 and illustrating a known manner in which a ceiling-type pole arrangement is keyed between a pair of space-divider panels.

Referring to FIGS. 1 and 2, there is illustrated a part of a conventional wall system 10 employing a pair of upright space divider panels 11 which are serially connected together. These panels 11 are typically in the range of from about 68 to 80 inches high, and hence have upper edges 12 which are spaced downwardly a substantial distance from the ceiling 13. The ceiling 13 is typically of the drop type in that it is formed by a plurality of panels removably supported on a suspended grid so that there is hence defined an open region above the ceiling for accommodating the mechanical systems of the building.

The panels 11, as is typical, are provided with a power pole arrangement 15 which is rigidly joined between the opposed adjacent end edges of the panels 11. This pole arrangement 15 projects upwardly from the floor to the ceiling to permit cabling, such as electrical and/or communication cabling, to be fed downwardly from the ceiling through the hollow interior of the pole arrangement for communication with and extension along the panels. For this purpose, the panels 11 are provided with raceway arrangements 16 extending along the lower horizontally extending edges thereof. These raceway arrangements 16, which are typical in open office systems of this type, are provided with electrical cabling disposed interiorly thereof for permitting electrical power to extend lengthwise along the wall system so as to be accessible from the work areas bounded thereby. Hence, electrical power can thus be supplied from a source or monument located adjacent the ceiling by feeding the electrical cabling downwardly through the hollow pole arrangement 15 for connection to cabling disposed within the raceways 16.

As illustrated by FIG. 2, the power pole arrangement 15 comprises a vertically elongated channel member 17 which effectively extends from the floor to the ceiling, which channel member 17 defines a vertically extending cable-receiving channel 18 in the interior thereof. This interior channel 18 is accessible from at least one side of the pole member 17 due to the channel-shaped cross section thereof, with the open side of this pole member being suitably closed by a removable cover 19 which resiliently snaps into the mouth of the channel member so as to be positioned substantially flush with the side of the pole member and hence substantially flush with the adjacent sides of the panels.

The pole member 17, as illustrated by FIG. 2, has opposed substantially parallel side walls 21 which are positioned directly adjacent the vertical end rails 22 provided on the panels 11. Each end rail 22 has a pair of vertically extending L-shaped grooves extending longitudinally thereof adjacent the opposite side edges of the rail. Each side wall 21 of the pole member similarly has a pair of vertically extending L-shaped grooves 24 extending longitudinally thereof adjacent the opposite corners of the pole member. These grooves 24 are disposed closely adjacent and directly opposite the grooves 23. Each opposed pair of grooves 23-24 cooperates with and mounts therein flange portions of a spline or key member 26. This key member 26 is conventional and comprises an elongated plastic hinge member which extends vertically throughout substantially the complete height of the panel 11. Since two such hinge members 26 are joined between each side wall 21 and the opposed end rail 22, this hence effects a rigid securement between the post member 17 and the respective panel 11.

The structure illustrated by FIGS. 1 and 2, and as described above, is conventional. Reference is made to U.S. Pat. Nos. 3,990,204, 4,060,294, 4,367,370 and 4,370,008 which illustrate wall systems employing electrified wall panels of this general type.

Figure 4:
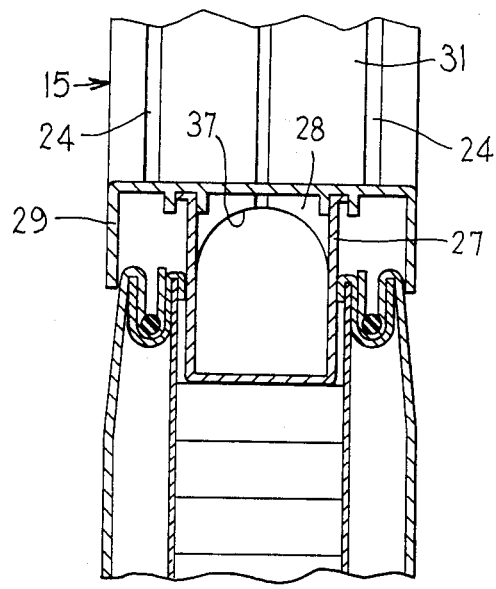
FIG. 4 is an enlarged fragmentary sectional view taken substantially along line IV—IV in FIG. 3.

To permit cabling, such as communication cables, to extend horizontally along the panels 11 adjacent the upper edges thereof, each panel 11 includes an upwardly opening channel member 27 (FIG. 4) which is fixedly associated with the panel and extends longitudinally and horizontally along the upper edge thereof. This channel member 27 defines therein a horizontal (that is, longitudinal) channel 28 for accommodating cabling such as communication cables which can be laid into the channel member 27 so as to extend in a hidden manner horizontally along the wall system. Access to this channel 28 is through the open top of the channel member 27, which open top is suitably closed by a removable horizontally-elongated top cap 29 which extends longitudinally along and defines the horizontally elongated upper edge of the panel.

Figure 5:
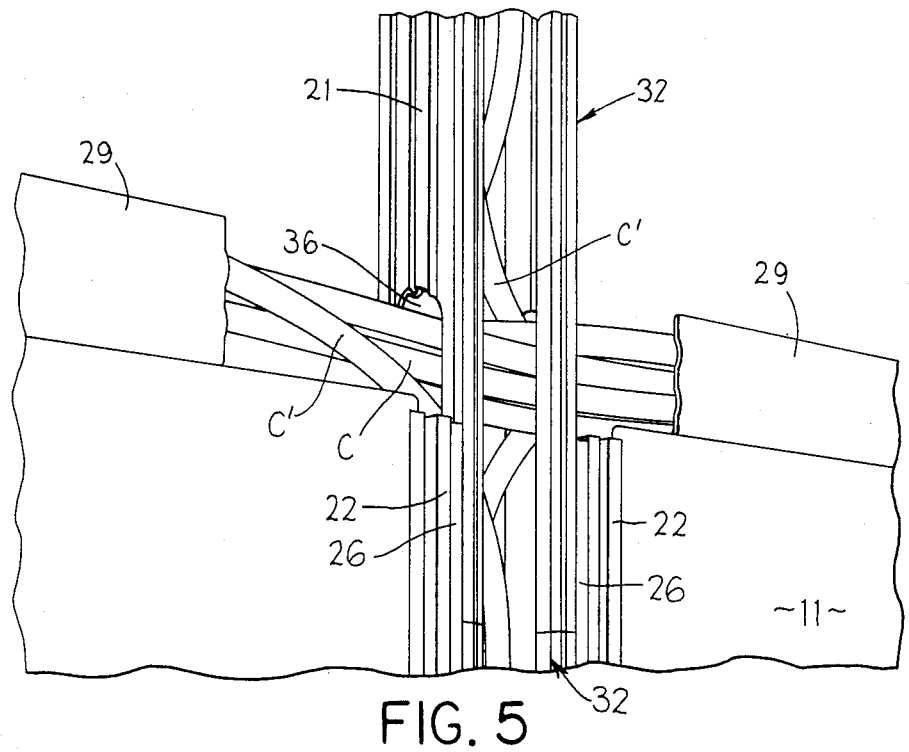
FIG. 5 is a fragmentary perspective view illustrating the improved pole arrangement of this invention in its assembled position as joined between a pair of adjacent panels.
Figure 6:
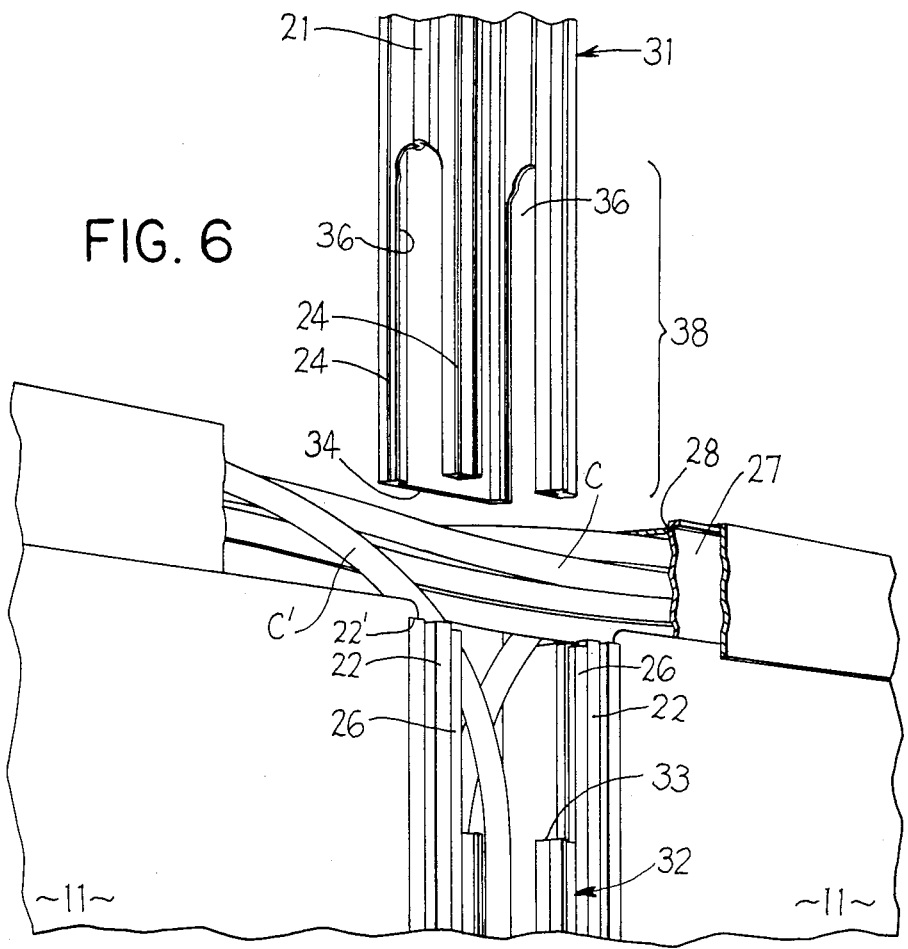
FIG. 6 is a view corresponding to FIG. 5 but illustrating the split pole arrangement in its separated condition to facilitate the laying-in of cabling.

To permit the cabling to extend continuously from the channel 28 of one panel across the pole arrangement 15 into the channel 28 of the adjacent panel, as indicated by the cabling C in FIGS. 5 and 6, the pole arrangement 15 has slots 36 formed in the opposed side walls 21 thereof for accommodating the cabling C. These slots 36 also permit cabling to extend from the interior of the pole into one of the channels 28 by being bent through an angle of 90° so as to extend through the slot 36, as indicated by the cabling C' in FIGS. 5 and 6.

To facilitate and simplify the laying in of these cables C or C' the pole arrangement 15 of this invention is of a longitudinally-split two-piece construction formed by top and bottom pole members 31 and 32, respectively. These two pole members 31 and 32 are identical in cross section and are disposed in vertically aligned and abutting engagement so as to effectively extend from the floor to the ceiling as illustrated by FIG. 1. The bottom pole member 32, however, has a length which is slightly less than the height of the panels 11 so that the upper free end 33 of the bottom pole member hence is disposed at a location which is a small distance, such as several inches, below the elevation of the channel 28. This hence results in the upper end 33 being disposed downwardly several inches from the upper ends 22' of the end rails 22. This bottom pole member 32 is effectively rigidly keyed between the adjacent panels 11 in the manner illustrated by FIG. 2, except that the keys or splines 26 project upwardly beyond the end surface 33 throughout substantially the full height of the end rails 22.

The upper or top pole member 31 has its lower free end 34 adapted to abut against the upper end 33 and hence effectively define a continuous vertical pole when the upper and lower pole members are assembled together as illustrated by FIG. 5. The upper pole member 31 hence has a lower portion 38 of limited extent projecting upwardly from the lower end surface 34, which lower pole portion 38 telescopes downwardly between the opposed end rails 22 of the panels 11 so as to be slidably engaged with the splines or keys 26 and hence create a rigid securement of the upper post member 31 to and between the pair of panels 11. The slots 36 are formed in the opposed side walls 21 of this upper post member 31, and these slots 36 open upwardly from the lower free end 34 thereof so that the slots 36 are hence closed only at the upper end thereof. The slots 36 cause the opposite side walls 21 of the top pole member 31, in the region of the lower end part 38 thereof, to be of a bifurcated or fork-like configuration.

Figure 3:
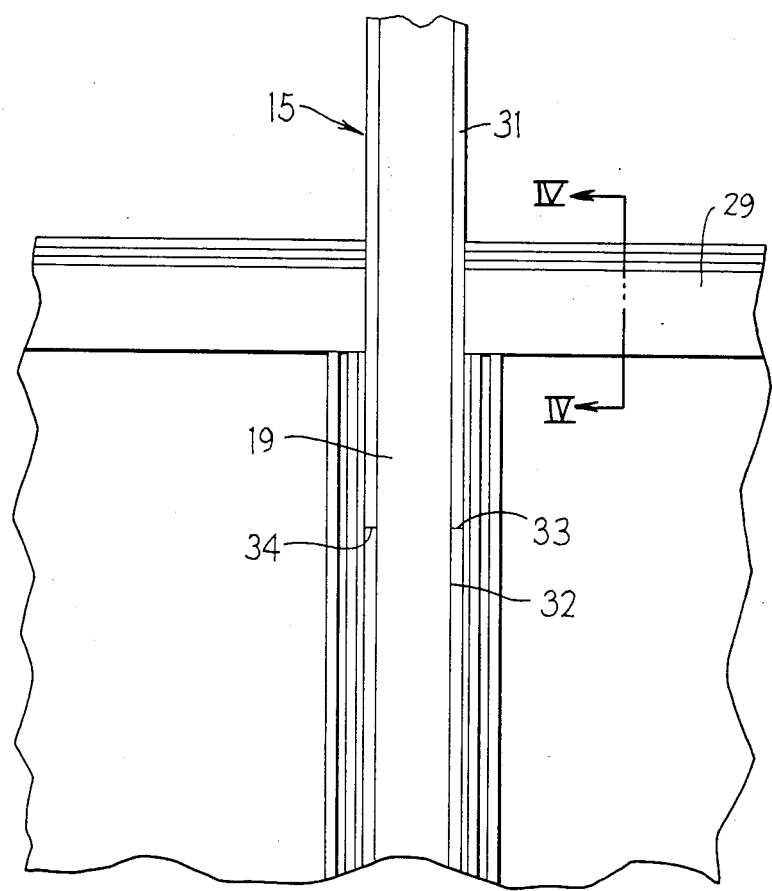
FIG. 3 is an enlarged, fragmentary elevational view which illustrates the improved pole arrangement of this invention joined between a pair of adjacent panels.

When the pole members 31 and 32 have been assembled together in the position illustrated by FIGS. 3 and 5, then a continuous one-piece cover 19 is resiliently snapped into position so as to close off the open mouth of the members 31 and 32. This one-piece cover 19 extends continuously throughout the length of the two pole members so as to hence effectively visually hide the joint between the upper and lower pole members while at the same time enclosing the cables within the interior of the pole members.

To install cabling in conjunction with the pole arrangement 15 of this invention, the top caps 29 and cover 19 are removed. The top pole member 31, is then slidably moved upwardly so as to disengage it from the keys 26. This provides open access between the aligned channels 28 of adjacent panels, substantially as illustrated by FIG. 6. This provides convenient access both to the horizontal channels 28 and to the vertical channel 18 which extends interiorly of the post. Cabling (either electrical or communication) can hence be readily laid into the channel of the upper post 31 and thence bent sidewardly into the horizontal channels 28, or cabling can be readily laid into the horizontal top channels 28 of adjacent panels so as to span across the region between the panels as indicated by the cabling C. Alternately, cabling can be suitably bent so as to extend from one of the horizontal channels 28 downwardly into the channel 18 of the lower post 31. All of this can be accomplished by merely laying in an intermediate portion of the cabling, and hence does not require any feeding of a leading end of the cable. After the cable had been appropriately laid into the desired channels, then the upper post pole member 31 can be moved downwardly so that the cables hence move upwardly into the slots 36 due to the bifurcated construction provided at the lower end of the upper pole member 31. The downward movement of the upper pole member 31 continues until the keys 26 enter into the lower ends of the grooves 24 associated with the pole member 31, which keys then slidably guide further downward movement of the pole member 31 until the lower end 34 thereof abuts the upper end 33 of the lower pole member 32. In this manner, the cables are now effectively confined within the slots 36 due to the latter being effectively closed due to the cooperation of the upper and lower pole members, and these upper and lower pole members themselves effectively define a continuous floor-to-ceiling arrangement. The one-piece cover 19 is then repositioned into the open side of the pole members 31-32 so as to close off the interior thereof, and hence create what appears to visually resemble a continuous pole arrangement.

The upward movement of the top pole 31 is possible due to the fact that the ceiling 13 is normally of the suspended, and hence sufficient clearance exists thereabove so as to permit the limited upward displacement of the top pole member 31 required so as to move it into the position illustrated by FIG. 6.

While the pole member 31 illustrated by FIG. 2 is of conventional U-shaped cross section, and hence opens only on one side and has a removable cover 19 associated therewith, it will be appreciated that the pole arrangement could also be of conventional H-shaped cross section so as to define channels opening outwardly on opposite sides, in which case each side would have a removable cover 19 associated therewith. Both U- and H-shaped poles are conventionally utilized.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a space-dividing wall system supported on a floor and spaced downwardly a substantial distance from a ceiling, said wall system having at least first and second upright wall panels horizontally serially connected and supported in an upright position on the floor, said panels having a height less than floor-to-ceiling height so that the panels have horizontally-extending upper edges which are spaces downardly a substantial distance from the ceiling, each of said first and second panels having an interior cable-receiving top channel formed therein and extending horizontally longitudinally therealing adjacent the respective upper edge thereof, each of said first and second panels also having a horizontally elongated top rail which is removably associated with the panel and closes off said top channel, and a vertically-extending pole arrangement extending from the ceiling downwardly to a location adjacent the floor, said pole arrangement being positioned between adjacent and opposed end rails of said first and second panels, said pole arrangement defining a hollow channel within the interior thereof and projecting longitudinally therealong for permitting cables to extend vertically therein, at least one side wall of said pole arrangement having an elongated slotlike opening extending longitudinally thereof and closed by a removable cover for permitting cables to be laid into said hollow channel, and vertically elongated key means coupled between the end rail of each of said first and second panels and an opposed end wall of said pole arrangement for horizontally fixedly coupling the first and second panels to said pole arrangement, comprising the improvement wherein said pole arrangement includes upper and lower vertically-elongated pole members disposed in vertically aligned relationship, said upper and lower pole members being of substantially identical cross section, said lower pole member having a vertical height which is less than the height of said panels so that said lower pole member projects upwardly from a location adjacent the lower edges of said panels so as to terminate in a free upper end disposed at a location close to but spaced downwardly from the upper edges of said panels, said lower pole member being secured to the end rails of said panels by said vertically elongated key means, said key means projecting vertically upwardly through at least a limited extent beyond free upper end of said lower pole member, and said upper pole member having a free lower end disposed substantially in abutting engagement with said lower pole member when in a use position, said upper pole member when in said use position having a lower vertically-elongated part thereo disposed between the first and second panels and vertically slidabley engaged with upper portions of said key means for horizontally fixedly connecting said upper pole member between said first and second panels, said upper pole member projecting upwardly from said free lower end to a point at least equal to the height of said ceiling, said key means permitting said upper pole member to be freely slidably displaced upwardly relative to said panels so as to be moved out of engagement with said key means, said upper pole member having vertically elongated slots formed in the end walls thereof in aligned relationship with one another, said slots opening upwardly from the lower free end of said upper pole member and projecting upwardly so that he slots define upper closed ends which are approximately horizontally aligned with said top channels when the upper pole member is in said use position so as to permit cables to extend from the top channel of the first panel through the slots and directly into the top channel of the second panel, and the upper and lower pole members defining therein respective upper an lower channels which extend longitudinally therethrough in open communication with one another and define said hollow channel so that cables can extend from one of said top channels through one said slot and then be bent to extend downwardly through said lower channel or upwardly through said upper channel.

2. A wall system according to claim 1 wherein the upper free end of said lower pole member is disposed at an elevation a small distance below said top channels.

3. A wall system according to claim 1, wherein said slotlike opening extends continuously along a side wall of said upper and lower pole members for permitting transverse laying in of cables into said hollow channel, and said removable cover comprising an elongated one-piece member extending from the lower end of said lower pole member to said ceiling for removably closing off the open side of said upper and lower pole members when the latter are in said use position.

* * * * *